United States Patent
Owen

[11] Patent Number: 6,139,331
[45] Date of Patent: Oct. 31, 2000

[54] BOARD BASE APPARATUS

[76] Inventor: Mike C. Owen, 3309 Woodland Rd., South Lake Tahoe, Calif. 96151

[21] Appl. No.: 09/467,900

[22] Filed: Dec. 21, 1999

[51] Int. Cl.$^7$ ............................... B43L 1/00; G09B 29/00
[52] U.S. Cl. .......................... 434/408; 434/413; 434/417; 434/425; 434/428; 434/430
[58] Field of Search ..................................... 434/408, 410, 434/413, 416, 417, 419, 422, 423, 425, 427, 428, 430, 247, 162; 160/135, 114; 40/605, 606, 539; 206/45.2, 723, 707, 728

[56] References Cited

U.S. PATENT DOCUMENTS

| | | | |
|---|---|---|---|
| 258,635 | 5/1882 | Elliott | 434/416 |
| 627,396 | 6/1899 | Daly | 434/413 |
| 1,099,748 | 1/1914 | Hopkins | 434/413 |
| 2,891,326 | 6/1959 | Fransson | 434/416 |
| 3,554,429 | 1/1971 | Cohen | 206/73 |
| 3,914,890 | 10/1975 | Behlen | 40/597 |
| 4,010,553 | 3/1977 | Bennett | 434/338 |
| 4,478,331 | 10/1984 | Ruin | 206/334 |
| 4,746,009 | 5/1988 | Liberman | 206/44.11 |
| 4,828,502 | 5/1989 | Leahy | 434/416 |
| 4,991,333 | 2/1991 | McLean | 40/534 |
| 5,035,626 | 7/1991 | Persing | 434/408 |
| 5,163,845 | 11/1992 | Blassingame | 434/408 |
| 5,263,866 | 11/1993 | Campbell | 434/416 |
| 5,494,442 | 2/1996 | Hecht | 434/267 |
| 5,513,746 | 5/1996 | Anderson | 206/738 |
| 5,518,217 | 5/1996 | Deutsch | 248/463 |
| 5,827,072 | 10/1998 | Neufer | 434/416 |
| 5,941,713 | 8/1999 | Wayner | 434/429 |

*Primary Examiner*—Jacob K. Ackun
*Assistant Examiner*—Kurt Fernstrom
*Attorney, Agent, or Firm*—Rodger H. Flagg

[57] ABSTRACT

A board base provides a storage and display unit for a plurality of markable white erasable presentation panels. Such presentation panels can be used with erasable marker pens. The board base can display one presentation panel and store four additional presentation panels. The board base can be adapted to permit either first side removal, second side removal, or top side removal. Set screws are provided for releasably securing these members. Indicia, such as color coded or numbered tabs permit ready identification by the user, and provide an accessible manual gripping portion for removal of each presentation panel. In operation, a selected presentation panel is removed from the framework in the board base, and the presentation panel is inserted into a front presentation slot in the lower track member. The presentation panel is positioned flush with the front board for ease of marking and viewing.

20 Claims, 7 Drawing Sheets

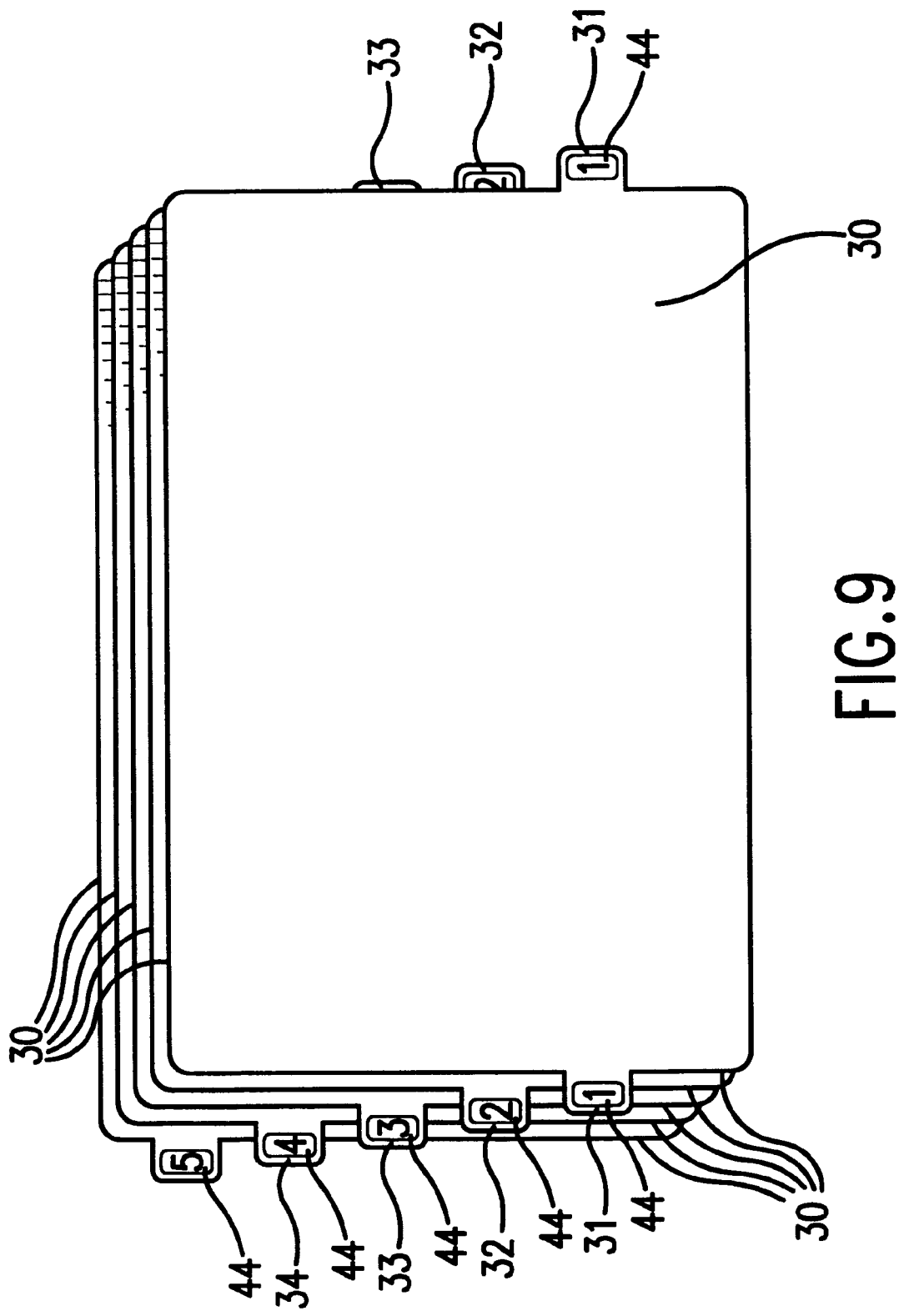

BOARD BASE APPARATUS

FIELD OF THE INVENTION

The present invention relates to a board base structure for use with multiple presentation panels and a storage arrangement for the presentation panels. More particularly, the invention relates to a storage and display unit for a plurality of erasable presentation panels.

BACKGROUND OF THE INVENTION

The use of erasable boards for presentation is known. Such boards include the well known chalkboards, such as blackboards and greenboards. Also known are more recent types which have a white surface which can be marked on by a removable color marker.

A store show window having movable boards is shown in U.S. Pat. No. 1,836,960 to Elias. In this patent, a plurality of display boards are independently suspended from tracks using trolleys.

A portable rostrum is shown in U.S. Pat. No. 3,531,898 to Facemire. In this patent, a plurality of display boards are suspended for sliding along a track. The boards are in overlying relation.

In U.S. Pat. No. 3,914,890 to Behlen, Jr., a vertically moveable multi-panel sign is disclosed. A plurality of display panels or signs are mountable within tracks formed in parallel upstanding side posts. The signs include gripping apertures in their upper portions to permit removable of the signs upwardly between the side posts.

A structure having a movable panel is shown in U.S. Pat. No. 4,716,693 to Webster. The structure includes details of roller assemblies used for movably supporting a sign or panel along a track.

A carrying and display case is shown in U.S. Pat. No. 4,746,009 to Liberman. The carrying and display case includes a pair of side panels having tracks therein for removably receiving a plurality of boards. The boards bear indicia to convey information, and also support product samples.

A markerboard is shown in U.S. Pat. No. 5,035,626 to Persing. The markerboard has a frame including side members supporting the markerboard, and is suitable for use in an office environment.

A display wall assembly is shown in U.S. Pat. No. 5,067,287 to Lewis. The assembly includes a front portion, a display area, and a slidable display panel which is movable from behind part of the front portion into the display area.

A sign assembly is shown in U.S. Pat. No. 5,088,221 to Bussiere et al. In this patent, the sign assembly includes a plurality of horizontally disposed tracks for support a plurality of horizontally slidable interchangeable signs. Each of the horizontally slidable interchangeable signs has a plurality of vertical channels for receiving respective ones of a plurality of panels bearing letters.

A portable free-standing visual aid is shown in U.S. Pat. No. 5,163,845 to Blassingame. In this patent, a case includes a chalkboard on one side thereof, and a slot for receiving a display board therein. The display board is removable from the case and can be slid in front of the chalkboard.

A reusable bulletin board display is shown in U.S. Pat. No. 5,622,504 to Hance. In this patent, a first display surface is mounted within a rigid frame, and a second display surface is detachably connected to overlie the first display surface using hook-and-loop fasteners.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a storage and display unit for a plurality of erasable presentation boards which may be selectively access from either side or from the top of the framework.

The board base apparatus according to the invention is a storage and display unit for markable white, colored or patterned erasable presentation panels. Such presentation panels can be used with erasable chalk or marker pens. The board base can display one panel and store a plurality of additional presentation panels or boards.

Another feature of the invention is the ability to permit selective left handed, right handed or top removal of the panels from the board base apparatus. It includes a lower track member, a back board, a first side track member, a second side track member, a front board, and an upper track member. A releasable fastening means, such as a plurality of set screws are provided for mounting these members. The panels include tabs with indicia to permit ready identification of the panels by the user. The tabs further provide an accessible manual gripping portion for selective removal of the presentation panels from the board base framework.

In operation, a selected presentation panel is removed from the tracks in the board base framework. The board base apparatus may be adapted to insert and remove panels from either the first side, the second side or the top portion of the board base apparatus. A front display slot receives the selected presentation panel for display. The selected presentation panel is positioned flush with the front cover and the bottom portion of the selected panel drops into a front presentation slot in the lower track member.

Other objects and advantages of the present invention will be more readily apparent from the following detailed description when read in conjunction with the accompanying drawings.

BRIEF DESCRIPTION OF THE DRAWINGS

FIG. 9 is a perspective view of a plurality of presentation panels having offset tabs with indicia on each tab to identify each presentation board.

DETAILED DESCRIPTION OF THE INVENTION

Figure 1:
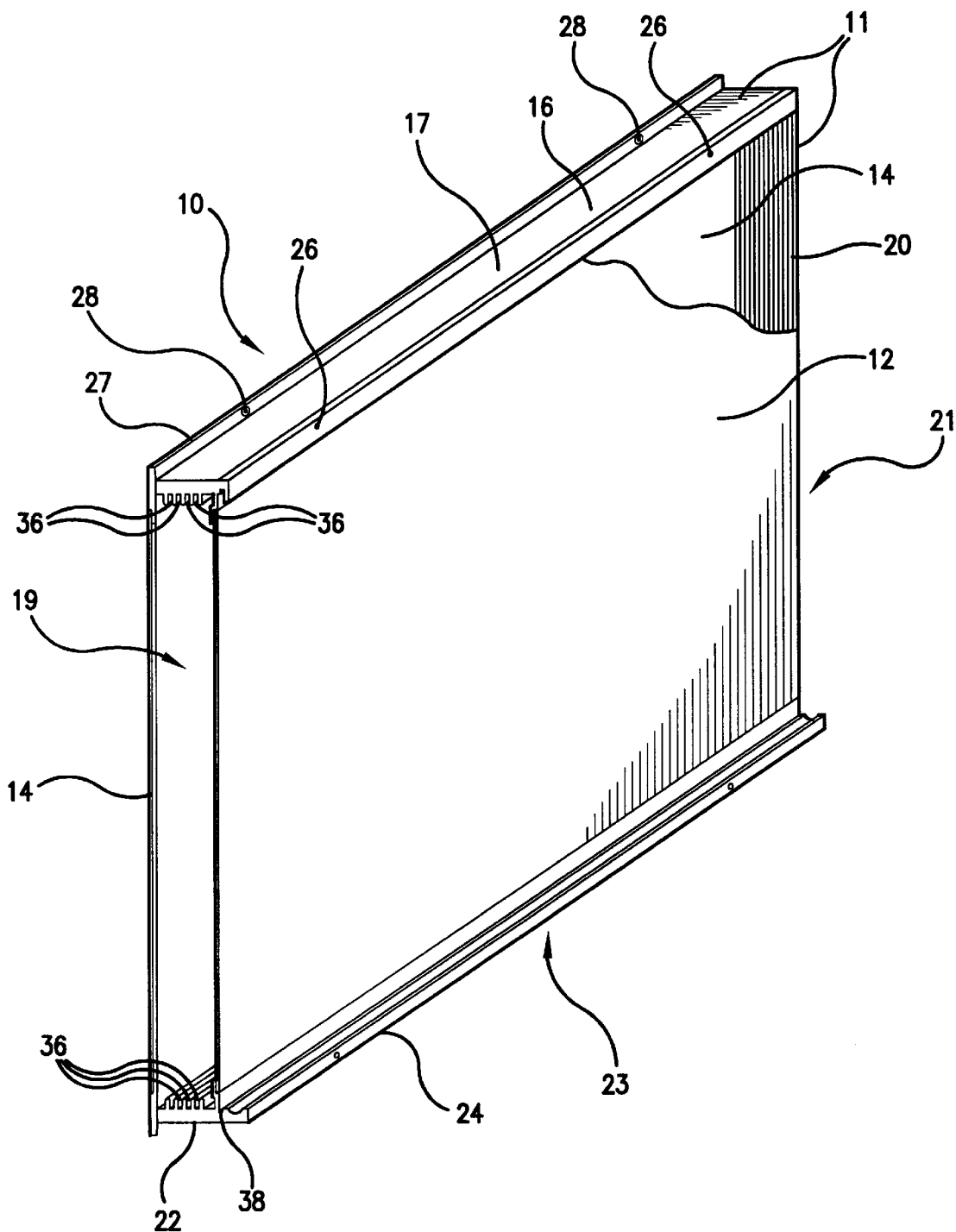
FIG. 1 is a perspective view of a board base apparatus according to the present invention.

FIG. 1 is a perspective view of a board base apparatus 10 according to the present invention. The board base apparatus 10 includes a framework 11, having a front board 12, a back board 14, an upper track member 16, a first side track member 18, a second side track member 20, and a lower track member 22. A storage tray portion 24 is connected to the front end of the lower track member 22. The storage tray portion 24 may be a fixed part of the lower track member 22, or may be removable, or hingedly secured to the lower track member 22, to suit manufacturing preference. A plurality of set screws 26 are provided for connection of the front board 12 and the back board 14 to the lower track member 22. Set screws 26 are also used to selectively secure two of the following: the first side track member 18, the second side track member 20 and the upper track member 16.

This allows the user to selectively insert and withdraw presentation panels 30 from one of: the first side 19, the second side 21, or the top side 17, in accordance with the user's preference.

Mounting screws 28 may be used to secure the back board 14 to a suitable vertical surface, such as a wall or partition. Alternately, the upper track member 16 may be provided with a mounting flange 27 having apertures 29 to receive mounting screws 28 therethrough. Likewise, the lower track member 22 may also have a mounting flange 27 with apertures 29 to receive mounting screws 28 therethrough. Where the upper track member 16 is selected to be removable from the top side 17, the first side track member 18 and the second side track member 20 may each also have a mounting flange 27 with apertures 29 to receive mounting screws 28 therethrough.

Figure 2:
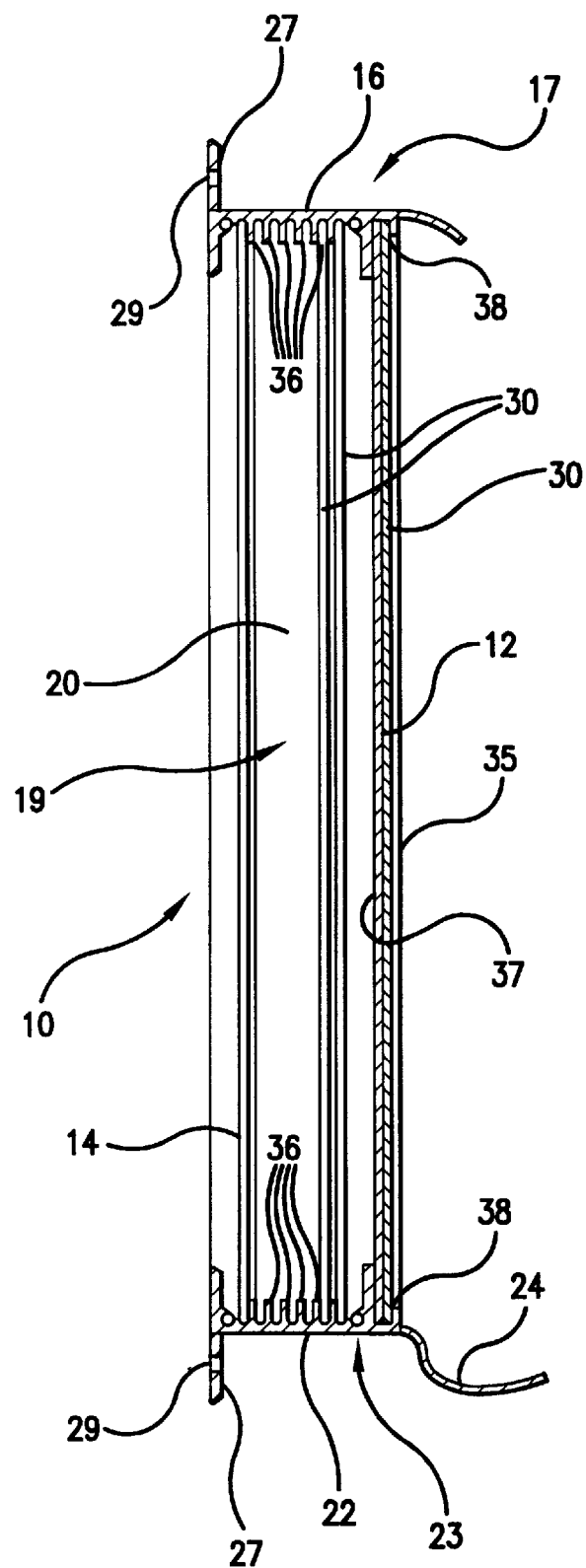
FIG. 2 is a cross sectional view of the device of FIG. 1, taken along lines 2—2 in FIG. 1.

FIG. 2 illustrates the device of FIG. 1 in cross-sectional view taken along lines 2—2 in FIG. 1.

Figure 3A:
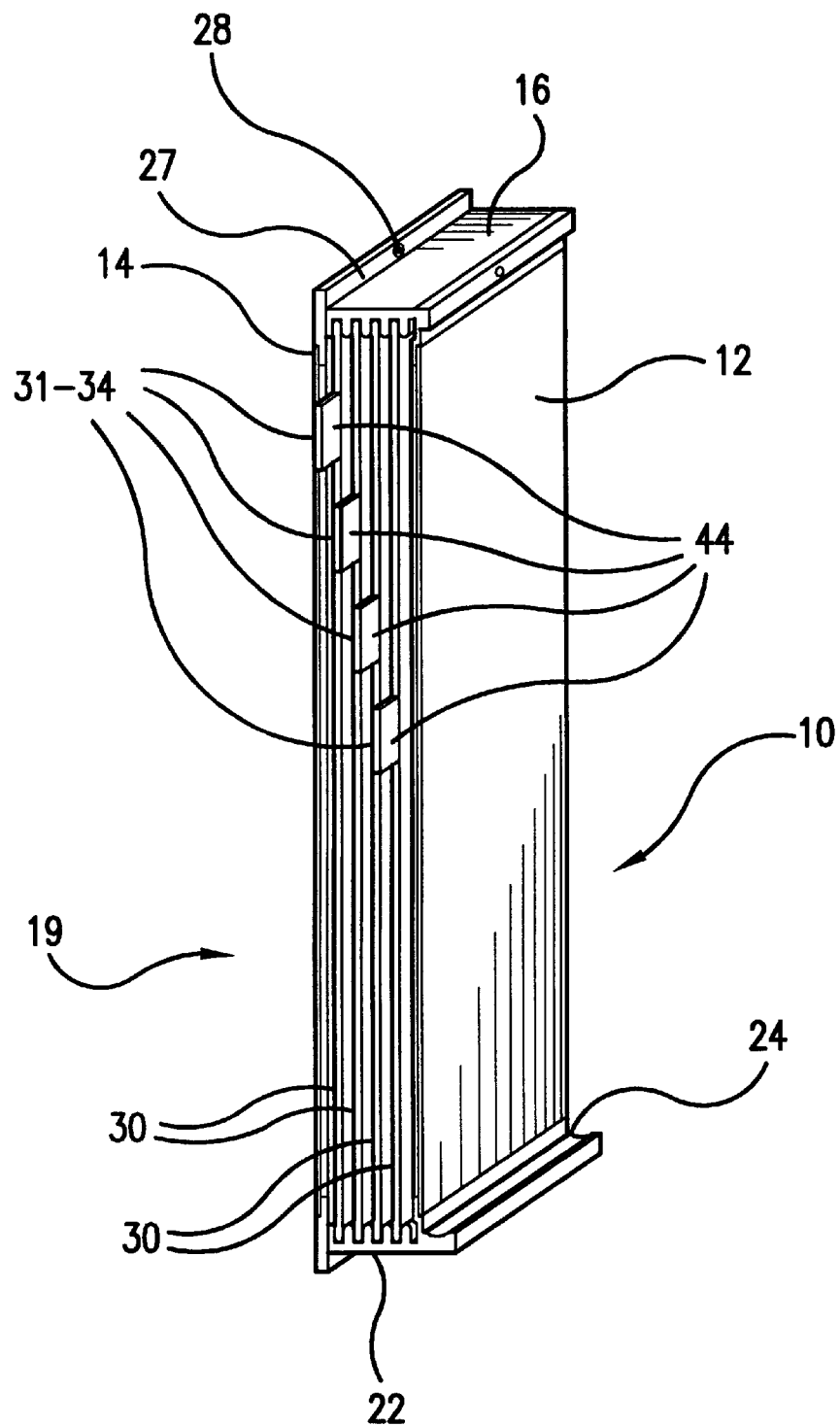
FIG. 3A is a perspective view of the device of FIG. 1, with access provided from a first side.

FIG. 3A is a perspective view of the board base apparatus shown from the first side 19, showing a plurality tabs 31, 32, 33, and 34 projecting from a plurality of presentation panels 30 on the first side 19. The panel tabs 31, 32, 33, and 34 are attached to respective presentation panels 30 which are slidably stored in slotted tracks 36 extending the length of the lower track member 22, the upper track member 16, and the second side track member 20.

The slotted tracks 36 are positioned in spaced relation between the front board 12 and the back board 14.

Indicia 44 is preferably located on each tab 31–34. The Indicia 44 may be in the form of colors, numbers, letters or symbols, or a combination of each of these. The plurality of tabs 31–34 are preferably offset for ease of viewing. The indicia 44 preferably varies from tab to tab 31–34, and from first presentation side 35 to second presentation side 37, for ease of identification.

FIG. 3A illustrates the device of FIG. 1, in perspective view, with the first side track member 18 removed, with colored panel tabs 31, 32, 33 and 34 shown projecting from a plurality of presentation panels 30 on the first side 19. As previously noted, the panel tabs 31, 32, 33, 34 are attached to respective presentation panels 30 which are slidably stored in slotted tracks 36 extending the length of the lower track member 22, the upper track member 16, and the first side track member 18. The slotted tracks 36 are positioned in spaced relation between the front board 12, and the back board 14.

Figure 3B:
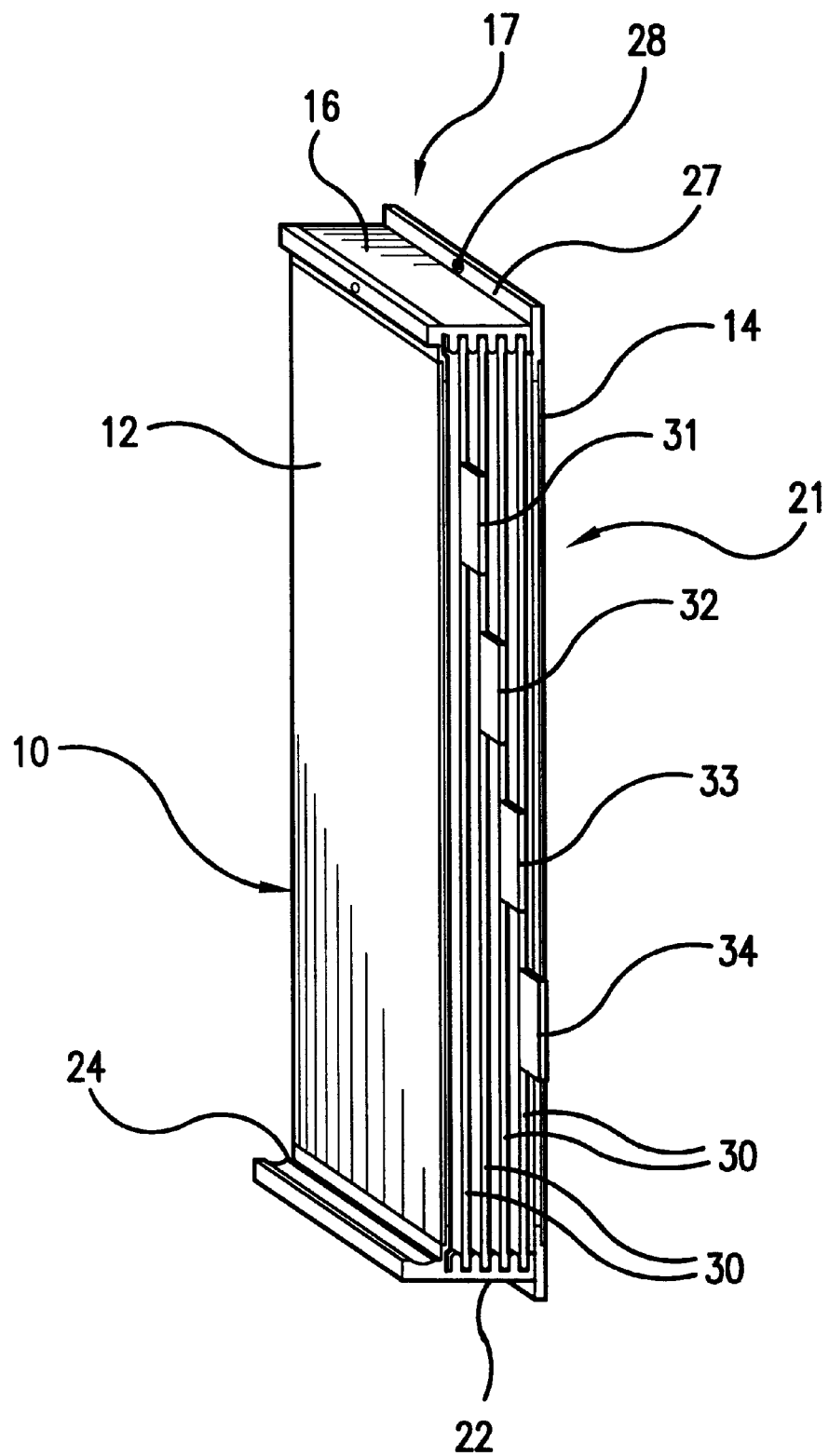
FIG. 3B is a perspective view of the device of FIG. 1, with access provided from a second side.

FIG. 3B illustrates the device of FIG. 1, in perspective view, with the second side track member 20 removed, with colored panel tabs 31, 32, 33, 34 shown projecting from a plurality of presentation panels 30 on the second side 21.

Figure 4:
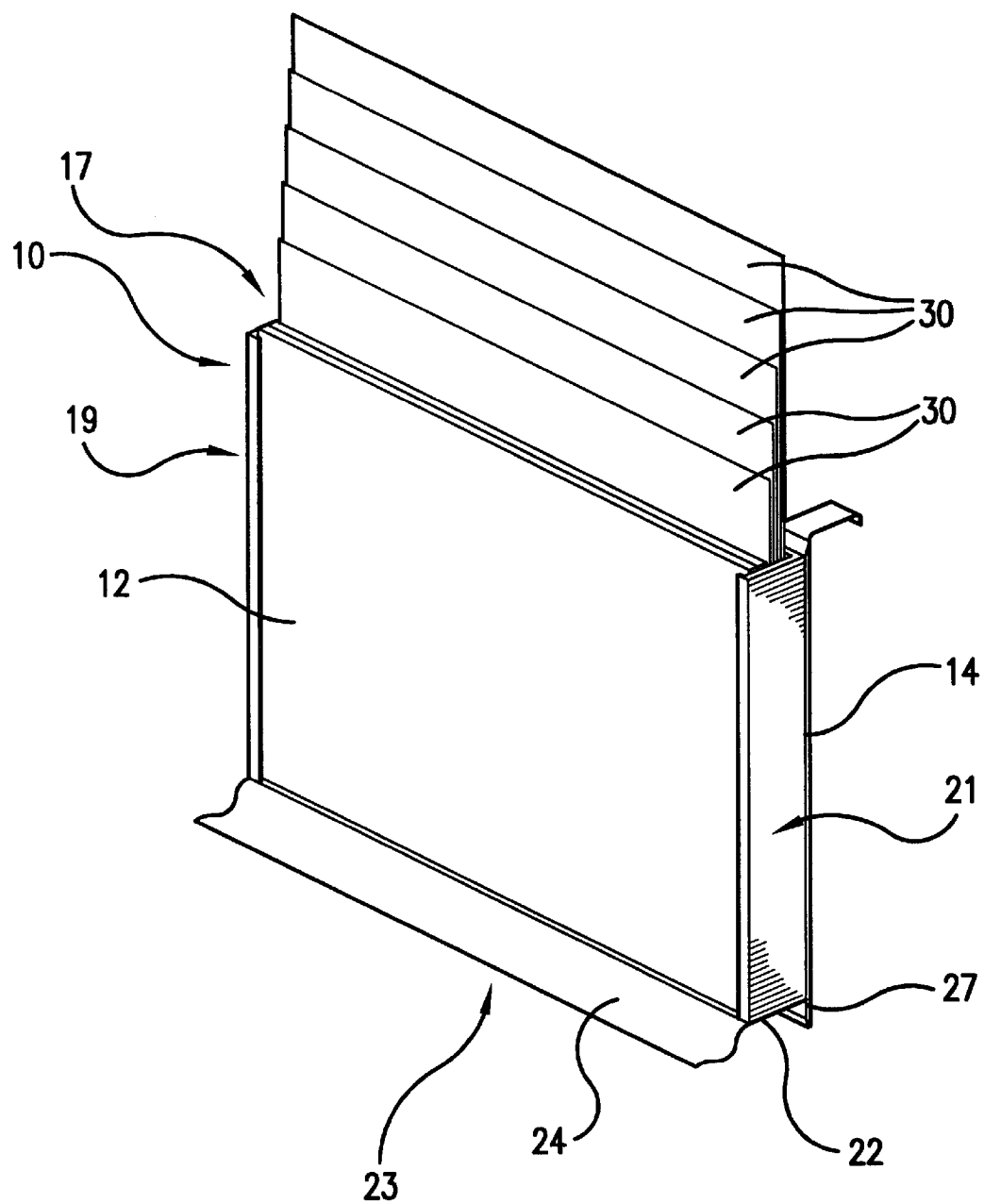
FIG. 4 is a perspective view of the device of FIG. 1, with access provided from a top side.

FIG. 4 illustrates the device of FIG. 1 in perspective view, with the upper track member 16 removed. A plurality of presentation panels 30 are shown partially inserted into the top side 17. The presentation panels 30 which are slidably stored in slotted tracks 36 extending the length of the lower track member 22, the first side track member 18 and the second side track member 20. The slotted tracks 36 are positioned in spaced relation between the front board 12 and the back board 14.

The plurality of presentation panels 30 are held in spaced, upright alignment between the slotted tracks 36. The slotted tracks 36 maintain a predetermined spacing between adjacent ones of the plurality of presentation panels 30.

The board base apparatus 10 is a storage and display unit for storing markable, erasable presentation panels 30, each having a first presentation side 35 and a second presentation side 37.

The plurality of presentation panels 30 may be white, colored, and/or patterned to suit user preference. The presentation panels 30 can be used with erasable marker pens, chalk or other marking apparatus (not shown). The board base apparatus 10 can display either the first presentation side 35 or the second presentation side 37 of a selected presentation panel 30 at a time, in front of the front board 12. The board base apparatus 10 also stores a plurality of additional presentation panels 30 in the slotted tracks 36 located between the front board 12 and the back board 14. This board base apparatus 10 provides storage and transport for multiple presentation boards 30 which may be selectively accessed by the user from one of the first side, the second side, and the top side.

While four such presentation boards 30 are shown being stored in the board base apparatus 10, it will be understood that additional presentation boards 30 may be employed, by increasing the number of slotted tracks 36 in the lower track member 22, the upper track member 16, the first side track member 18 and the second side track member 20. All such variations are contemplated as being within the scope of the present invention.

Figure 5:
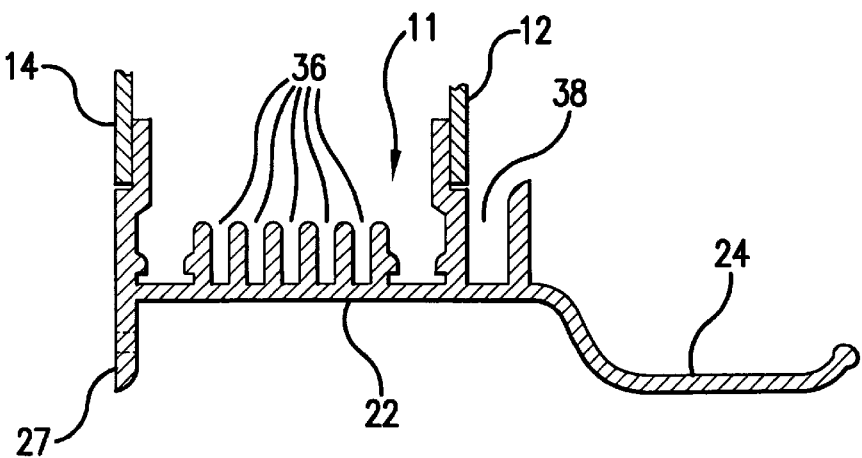
FIG. 5 is a cross sectional view of the lower track member shown In FIG. 1.

FIG. 5 is a cross sectional view of the lower track member 22 shown in FIG. 1, showing the storage tray portion 24 extending from the lower track member 22. A front presentation slot 38 is provided in the lower track member 22 in front of the front board 12, to slidably receive a presentation panel 30 for viewing or for marking. Preferably, the storage tray portion 24 and the mounting flange 27 located on the lower track member 22 are horizontally aligned, to provide a stable base for support of the board base apparatus 10 on a suitable horizontal planar surface (not shown), such as a table or countertop.

Figure 6:
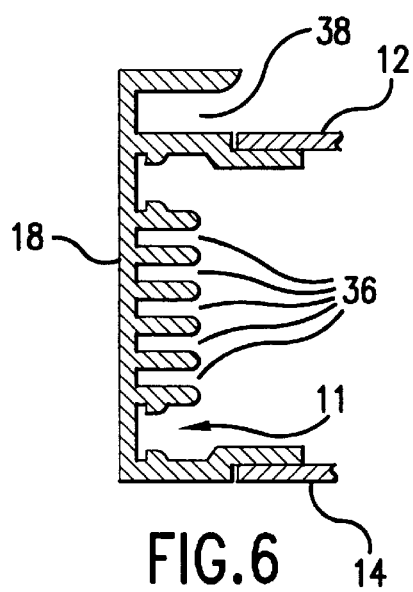
FIG. 6 is a cross sectional view of the first side track member shown in FIG. 1

FIG. 6 is a cross sectional view of the first side track member 18 shown in FIG. 1. Note that the slotted tracks 36 in the first side track member 18 are sized to align with the slotted tracks 36 in the lower track member 22 and the upper track member 16.

Figure 7:
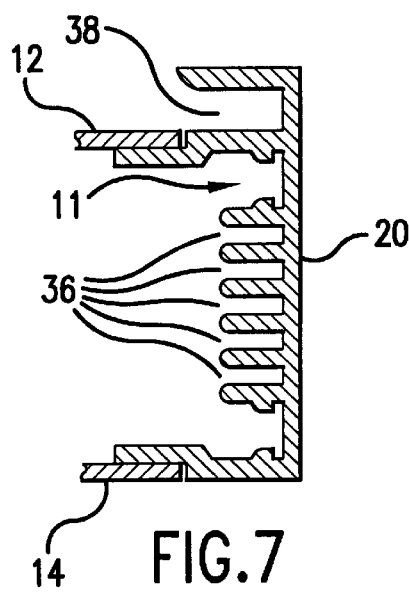
FIG. 7 is a cross sectional view of the second side track member shown in FIG. 1.

FIG. 7 is a cross sectional view of the second side track member 20 shown in FIG. 1. Note that the slotted tracks 36 in the second side track member 20 are sized to align with the slotted tracks 36 in the lower track member 22 and the upper track member 16.

Figure 8:
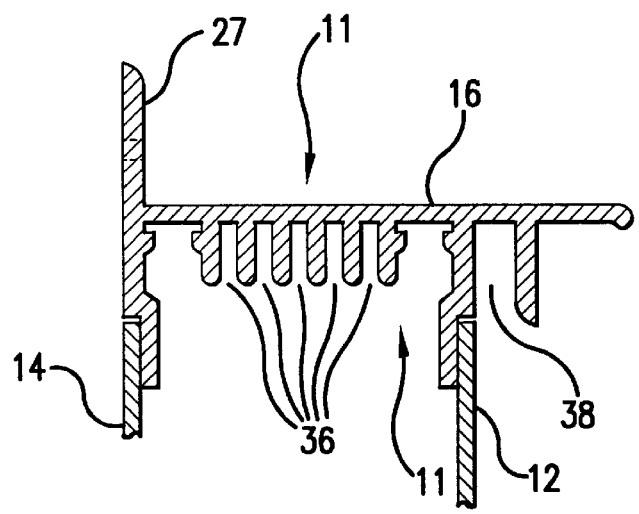
FIG. 8 is a cross sectional view of the upper track member shown in FIG. 1.

FIG. 8 is a cross sectional view of the upper track member 16 shown in FIG. 1. Note that the slotted tracks 36 in the upper track member 16 are sized to align with the slotted tracks 36 in the first side track member 18 and the second side track member 20.

Note that the corners of the lower track member 22, the first and second side track members 18, 20 and the upper track member 16 are each cut at about 45 degrees towards the center of the framework 11 to align adjacent corners of the framework 11 into a picture frame configuration, with the front board 12 and back board 14 securing the framework 11 together.

The first side track member 18, the second side track member 20, the lower track member 22, and the upper track member 16, are each preferably extruded from either metal or plastic. The front board 12 and the back board 14 are preferably made from flat sheet stock of either metal or plastic.

The back board 14 and front board 12 may be releasably secured to the framework 11 by any known releasable securement means 26, such as with screws, bolts, etc. The framework 11 may in turn be secured to a vertical surface such as a wall or partition by any known mounting means 28, such as mounting screws, brackets, hangers, etc.

In the preferred embodiment, the display panels 30 are high contrast white panels having a first presentation side 35 and a second presentation side 37 which are approximately one-eighth inch thick, and are approximately 3 feet high and 4 feet wide.

FIG. 9 is a perspective view showing a plurality of presentation panel 30 with offset tabs 31–34 secured to the presentation panels 30, for ease of locating and removing a selected presentation panel 30 stored in the board base apparatus 10.

In operation, the user selects access to the presentation panels 30 within the framework 11 to one of the first side 19, the second side 21 or the top side 17, according to the needs of the user. If the first side 19 access is selected, the first side track member 18 is not secured to the framework 11. If the second side 21 access is selected, the second side track member 20 is not secured to the framework 11. If the top side 17 access is selected, then the upper track member 16 is not secured to the framework 11.

The three remaining portions of the framework 11 remain secured to the front board 12 and to the back board 14. This allows the user to selectively remove any one of the presentation panels 30 located in respective slotted tracks 36 within the framework 11 from the selected one of the first side 19, the second side 21 or the top side 17. During shipping, transport or storage, all four sides of the framework 11 may be releasably secured to the framework 11 to protectively secure the plurality of presentation panels 30 within the board base apparatus 10. The board base apparatus 10 may be mounted on a vertical surface, such as a wall or partition, or may be supported upon a horizontal planar surface, such as a table or countertop, to suit the needs of the user. This flexibility is useful during presentations at a remote location, as well as at home or at the office.

The selected presentation panel 30 is removed from the slotted tracks 36 in the framework 11 by grasping the selected tab 31–34 and withdrawing the presentation panel 30. Upon removal of the presentation panel 30 from the framework 11, the selected presentation panel is inserted into the front presentation slot 38 located in front of the front board 11. The presentation panel 30 can be removed from In front of the front board 11 by reversing the foregoing steps, and another one of the presentation panels 30 may be put in its place. Where both sides 35, 37 of the presentation panel 30 are used, the panel may be removed from the front presentation slot 38 rotated or inverted and reinserted into the front presentation slot 38. This effectively doubles the number of presentation views available.

The invention being thus described, it will be evident that the same may be varied in many ways. Such variations are not to be regarded as a departure from the spirit and scope of the invention and all such modifications are intended to be included within the scope of the claims.

I claim:

1. A board base apparatus for selectively storing, transporting and displaying a plurality of presentation panels, which comprises:

a board base framework, having a back board, a front board, a lower track member, a first side track member, a second side track member and an upper track member;

a plurality of slotted tracks extend in spaced relation within the framework the length of the lower track member, the first side track member, the second side track member and the upper track member;

a plurality of presentation panels sized to be slidably received in a selected one of the plurality of slotted tracks, each presentation panel having a first presentation side and a second presentation side;

a fastening means for selectively, releasably securing the back panel and the front panel to the bottom frame member and two of the following: the first side track member, the second side track member and the upper track member, the unsecured track member providing access for slidably receiving and removing a selected presentation panel from the board base framework;

and a front presentation slot disposed in front of the front panel in the lower track member, the upper track member, the first side track member, and the second side track member to slidably receive and display one of a first presentation side and a second presentation side of a selected presentation panel for ease of marking and viewing.

2. The board base apparatus of claim 1, wherein a tab is secured to each of the presentation panels for ease of slidably receiving and removing a selected presentation panel from the board base framework.

3. The board base apparatus of claim 2, wherein each tab includes indicia to identify each presentation panel stored in the board base framework.

4. The board base apparatus of claim 1, wherein a storage tray portion extends beyond the front presentation slot of the lower track member.

5. The board base apparatus of claim 1, wherein the back board includes a mounting means for releasably securing the board base apparatus to an existing vertical wall surface.

6. The board base apparatus of claim 1, wherein the lower track member and the storage tray portion are adapted to vertically support the board base framework from a horizontal planar surface.

7. The board base apparatus of claim 1, wherein the lower track member, the upper track member, the first side track member and the second side track member are extruded from one of a metal and a plastic.

8. A board base apparatus for selectively storing, transporting and displaying a plurality of presentation panels, which comprises:

a board base framework, having a back panel, a front panel, a lower track member, a first side track member, and a second side track member;

a plurality of slotted tracks extending within the framework the length of the lower track member, the first side track member, and the second side track member;

a plurality of presentation panels sized to be slidably received from a top side in a selected one of the plurality of slotted tracks, each presentation panel having a first presentation side and a second presentation side;

a fastening means for selectively securing the back panel and the front panel to the lower track member, the first side track member, and the second side track member, the top side providing access for slidably receiving and removing a selected presentation panel from the board base framework; and a front presentation slot is disposed in front of the front panel in the lower track member, the first side track member, and the second side track member to slidably receive and display one of the first presentation side and the second presentation side of a selected presentation panel for ease of marking and viewing.

9. The board base apparatus of claim 8, wherein an offset tab is secured to each of the presentation panels for ease of slidably receiving and removing a selected presentation panel from the board base framework.

10. The board base apparatus of claim 9, wherein each of the plurality of tabs includes indicia to identify each presentation panel stored in the board base framework.

11. The board base apparatus of claim 8, wherein a storage tray portion extends beyond the front presentation slot of the lower track member.

12. The board base apparatus of claim 8, wherein the back panel includes a mounting means for securing the board base apparatus to an existing vertical wall surface.

13. The board base apparatus of claim 8, wherein the lower track member and the storage tray portion are adapted to vertically support the board base framework from a horizontal planar surface.

14. A board base apparatus for selectively storing, transporting and displaying a plurality of presentation panels, which comprises:

a board base framework, having a back panel, a front panel, a lower track member, an upper track member, and one of a first side track member and a second side track member, with one of the first side track member and the second side track member providing access to a plurality of presentation panels stored within the framework;

a plurality of slots extending within the framework the length of the lower track member, the upper track member, and one of the first side track member and the second side track member;

a plurality of presentation panels sized to be slidably received in a selected one of the plurality of slotted tracks, each presentation panel having a first presentation side and a second presentation side;

a fastening means for selectively securing the back panel and the front panel to the lower track member, the upper track member and one of the first side track member and the right side frame member, the unsecured side frame member providing access for slidably receiving and removing a selected presentation panel from the board base framework;

and a front presentation slot disposed in front of the front panel in the lower track member and the upper track member to slidably receive and display one of the first side and the second side of a selected presentation panel from within the framework for marking and viewing.

15. The board base apparatus of claim 14, wherein a tab is secured to each of the presentation panels for ease of slidably receiving and removing a selected presentation panel from the board base framework.

16. The board base apparatus of claim 15, wherein each tab includes indicia to identify each presentation panel stored in the board base framework.

17. The board base apparatus of claim 14, wherein a storage tray portion extends beyond the front presentation slot on the lower track member.

18. The board base apparatus of claim 14, wherein the back side includes a mounting means for securing the board base apparatus to an existing vertical wall surface.

19. The board base apparatus of claim 14, wherein the lower track member is adapted to vertically support the board base framework from a horizontal planar surface.

20. The board base apparatus of claim 14, wherein the lower track member, the upper track member, the first side track member and the second side track member are extruded from one of: metal and plastic.

* * * * *